United States Patent [19]
Tejima et al.

[11] Patent Number: 5,283,599
[45] Date of Patent: Feb. 1, 1994

[54] APPARATUS FOR COMBINING AND PROJECTING IMAGES

[75] Inventors: Yasuyuki Tejima; Takashi Iizuka, both of Tokyo; Yasunori Arai, Saitama; Nobutaka Minefuji, Tokyo, all of Japan

[73] Assignee: Asahi Kogaku Kogyo Kabushiki Kaisha, Tokyo, Japan

[21] Appl. No.: 909,567

[22] Filed: Jul. 6, 1992

[30] Foreign Application Priority Data

Jul. 8, 1991 [JP] Japan .................. 3-263364
Aug. 1, 1991 [JP] Japan .................. 3-216134
Aug. 13, 1991 [JP] Japan .................. 3-288234

[51] Int. Cl.⁵ .................. G03B 21/14; G03B 3/00
[52] U.S. Cl. .................. 353/30; 353/34; 353/37; 353/101; 35/40
[58] Field of Search .......... 353/37, 31, 34, 30, 353/69, 98, 100, 101, 102; 359/40, 41, 83

[56] References Cited

U.S. PATENT DOCUMENTS

| | | | |
|---|---|---|---|
| 4,756,604 | 7/1988 | Nakatsuka et al. | 359/41 |
| 4,796,978 | 1/1989 | Tanaka et al. | 359/40 |
| 4,864,390 | 9/1989 | Mekechnie et al. | 353/34 |
| 5,092,671 | 3/1992 | Van Os | 353/31 |
| 5,179,398 | 1/1993 | Iizuka | 353/37 |

FOREIGN PATENT DOCUMENTS

| | | | |
|---|---|---|---|
| 0071920 | 4/1987 | Japan | 359/40 |
| 4-001744 | 1/1992 | Japan | 353/31 |

*Primary Examiner*—William A. Cuchlinski, Jr.
*Assistant Examiner*—William C. Dowling
*Attorney, Agent, or Firm*—Kane, Dalsimer, Sullivan, Kurucz, Levy, Eisele and Richard

[57] ABSTRACT

An image combining and projecting apparatus having a plurality of light transmission type image panels through which light beams are transmitted, condenser lenses corresponding to the light transmission type image panels, a beam combining mechanism which combines beams transmitted through the image panels, and a projection lens through which beams are projected after being combined by the beam combining mechanism, wherein the condenser lenses are provided on the light outgoing side of the corresponding image panels. The apparatus further has a condenser lens adjusting mechanism for adjusting the positions of the condenser lenses.

14 Claims, 15 Drawing Sheets

APPARATUS FOR COMBINING AND PROJECTING IMAGES

BACKGROUND OF THE INVENTION

1. Field of the Invention

The present invention relates to an apparatus for combining and projecting a plurality of images through light transmission type image panels, such as liquid crystal panels, and also relates to a method and an apparatus for adjusting the image combining and projecting apparatus.

2. Description of Related Art

In a known three-plate type of liquid crystal color projector, white light emitted from a light source is separated into three primary colors of red (R), green (G) and blue (B) by a dichroic mirror, so t hat the three colors are made incident upon three respective liquid crystal panels which indicate red, green, and blue image data. The three beams of colored light are projected onto a screen through an image combining means, such as condenser lenses corresponding to the liquid crystal panels, and a projection lens to obtain a color image. In an apparatus that employs this type of optical arrangement, the condenser lenses are provided in front (i.e., optically upstream) of the liquid crystal panels.

As is well known, transmittance of a beam incident upon a liquid crystal panel depends on the incident angle of the beam. Namely, the liquid crystal panel has an irregular transmittance that is dependent upon the angle of beams incident thereon.

Consequently, in the known optical arrangement as mentioned above, in which the condenser lenses are located on the optically upstream side of the liquid crystal panels, the beams converged by the condenser lenses are made incident upon the respective liquid crystal panels. Accordingly, the image projected on the screen may be adversely affected by an irregularity in the transmittance due to a difference in the incident angle.

To eliminate the adverse influence, recent image combining and projecting apparatuses have condenser lenses that are located behind the liquid crystal panels, i.e., on the emission side of the liquid crystal panels. In this arrangement, the collimated beams (parallel beams) are incident upon the liquid crystal panels and the beams emitted from the liquid crystal panels are condensed by the condenser lenses Nevertheless, the improved arrangement of the condenser lenses behind the liquid crystal panels has invited another problem as discussed below. Namely, in a three-plate type of liquid crystal projector, it is necessary to make three images, formed by the three liquid crystal panels, precisely coincident with each other to obtain a clear color image. Arrangement of the condenser lenses on the outgoing side of the liquid crystal panels results in the possibility of distortion when the optical axes of the condenser lenses are deviated from the optical axis of the projection lens. The distortion that results under such circumstances is asymmetric. Therefore, if the optical axes of the condenser lenses corresponding to the three liquid crystal panels vary with respect to the optical axis of the projection lens, a difference in shape of the projected images formed by the respective liquid crystal panels will result. The projected images being deviated from one another will result in a dimmed or unclear color image.

If, in addition to trapezoidal distortion, a mounting error occurs upon assembly of the three liquid crystal panels, the corresponding condenser lenses, and/or the projection lens which combines and projects the three colored images, etc., three colored trapezoidal distortions, which do not correctly overlap, are projected onto the screen. To eliminate the trapezoidal distortions which do not correctly overlap, it is necessary to precisely position the above-mentioned elements of the assembly. However, this requires a fine and troublesome adjustment of the assembly.

On the other hand, if the condenser lenses are arranged on the incident side of the liquid crystal panels, the deviation of the optical axes of the condenser lenses from the optical axis of the projection lens are theoretically the main cause of irregular illuminance. However, the trapezoidal distortion resulting from the deviation of the optical axes of the condenser lenses is not as significant in this arrangement. Generally speaking, there is a larger allowance for the deviation of the optical axes of the condenser lenses from the optical axis of the projection lens when the condenser lenses are arranged on the incident side of the liquid crystal panel than when the condenser lenses are arranged on the outgoing side of the liquid crystal panels. Therefore, positional adjustment of the condenser lenses has not been taken into consideration in the known arrangement in which the condenser lenses are located on the incident side of the liquid crystal panels.

In the known liquid crystal color projector as mentioned above, light combining means, such as dichroic mirrors or dichroic prisms are inserted between the projection lens and the liquid crystal panels to combine images formed by the liquid crystal images and thereby obtain a projection image. However, the dichroic mirrors or the dichroic prisms have an inevitable manufacturing error or mounting error (assembling error), etc., which results in a different position for each of the three colors.

There is another problem in the case that a zoom lens is used as the projection lens. In a zoom lens, as is well known, it is necessary to effect a zoom adjustment in which the focal position is kept constant, even if the zooming is carried out by the zoom lens system, and a back focus adjustment (back distance adjustment) in which the position of a liquid crystal panel is made coincident with the focal position obtained by the zoom adjustment.

For example, in the case of a simple zoom lens having two groups of lenses, generally speaking, the zoom adjustment is effected by the movement of the first lens group in the optical axis direction, and the back focal adjustment is effected by the axial movement of the first and second lens groups in combination. However, in a projector in which a plurality of images are combined and projected, the focal point of the three colors varies due to errors which inevitably occur in the manufacturing process or when mounting (assembling) the dichroic mirrors or the dichroic prisms, etc., as mentioned above. Accordingly, it is impossible to project all the color images with a correct focal point, even if the zoom adjustment and the back focus adjustment are carried out by the zoom lens in the known focal adjustment method, as mentioned above.

Furthermore, in the known liquid crystal color projector as mentioned above, it is preferable that the optical axis of the beam separating optical system, which separates the beams emitted from the light source and makes them incident on the liquid crystal panels, is coincident with or at least parallel to the optical axis of the beam combining and projecting optical system for combining the beams transmitted through the liquid crystal panels. However, due to the possibility of a mounting error and irregularity in the position of the light source and the various mirrors, etc., a slight positional deviation between the axis of the beam separating optical system and the axis of the optical axis of the beam combining optical system may result. Generally speaking, these axes intersect at an angle. Consequently, only a part of the beams of the beam separating optical system can be received by the projection lens, resulting in an irregular amount of light which is received and an uneven color distribution, etc. In order to effectively gather all the beams transmitted through the beam separating optical system, it is necessary to use a bright projection lens having a large beam receiving angle, i.e., a small F-number. However, this is very costly.

SUMMARY OF THE INVENTION

The primary object of the present invention is to provide an image combining and projecting apparatus having condenser lenses which are optically located behind a plurality of corresponding liquid crystal panels, wherein images formed by the liquid crystal panels are exactly overlapped and combined. In particular, the present invention is aimed at a provision of an image combining and projecting apparatus in which images distorted by the condenser lenses and/or images which have trapezoidal distortion can be easily adjusted to precisely overlap.

Another object of the present invention is to eliminate the drawbacks of the prior art as mentioned above by providing a focus adjusting apparatus in which focal points of a plurality of images to be combined and projected can be easily made coincident with each other.

Still another object of the present invention is to provide a focus adjusting method in an image combining and projecting apparatus having a zoom lens as a projection lens, wherein a back focus adjustment of the zoom lens can be easily effected.

Yet another object of the present invention is to provide an image combining and projecting apparatus in which an optical axis of a beam separating and illuminating optical system and an optical axis of a beam combining and projecting optical system can be easily adjusted to be parallel to each other without using a bright projection lens having a small F-number, while maintaining a high image quality.

According to an aspect of the present invention, there is provided an image combining and projecting apparatus having a plurality of light transmission type image panels through which light beams are transmitted, condenser lenses corresponding to the light transmission type image panels, a beam combining means which combines beams transmitted through said image panels, and a projection lens through which beams are projected after being combined by said beam combining means, wherein the condenser lenses are provided on the light outgoing side of the corresponding image panels and wherein said apparatus comprises position adjusting means for adjusting the positions of the condenser lenses in directions perpendicular to the optical axes thereof.

A plurality of images having distortions can be formed with an identical shape by adjusting the position of the condenser lenses in the direction perpendicular to the optical axis. A plurality of images can be easily and precisely overlapped by adjusting the position of the condenser lenses relative to the corresponding image panels in the directions of the optical axes of the respective image panels.

The condenser lenses can be embodied by spherical lenses, aspherical lenses or Fresnel lenses, etc.

Condenser lenses having optical axes which are not coincident with the optical axis of the projection lens (i.e., eccentric lenses) can also be used. The eccentric lenses have a good optical property for beams which are incident thereon in oblique directions with respect to the optical axes of the liquid crystal panels. The identical shape and the precise overlap of the images as mentioned above can be realized by appropriately selecting the degree of eccentricity.

According to another aspect of the present invention, in an image combining and projecting apparatus having a plurality of light transmission type image panels through which light beams are transmitted, condenser lenses corresponding to the light transmission type image panels, a beam combining means which combines beams transmitted through said image panels, and a projection lens through which beams are projected after being combined by said beam combining means, the condenser lenses are provided on the light outgoing side of the corresponding image panels and the apparatus comprises tilt adjusting devices which adjust inclination angles of the condenser lenses with respect to the optical axis thereof.

The adjustment by the tilt adjusting device can easily correct the trapezoidal distortion.

One of the significant features of the image combining and projecting apparatus according to the present invention resides in the fact that the optical axes of the condenser lenses are not aligned with the optical axis of the projection lens when the adjustment is completed. In other words, in this state, the centers of the image panels are deviated from the optical axis of the projection lens.

According to yet another aspect of the present invention, in an image combining and projecting apparatus having a plurality of light transmission type image panels through which light beams are transmitted, condenser lenses corresponding to the light transmission type image panels, a beam combining means which combines beams transmitted through said image panels, and a projection lens through which beams are projected after being combined by said beam combining means, the provision is made to an image panel adjusting means for adjusting the positions of the image panels along the optical axes thereof.

Each image panel adjusting means for each image panel can adjust the position of the associated image panel to move the latter to an optimum focal point, so that images formed and combined by the image panels are in focus.

The subject of the present invention is also directed to a novel focus adjusting method in an image combining and projecting apparatus having a zoom lens as a projection lens and image panel adjusting means.

The focus adjusting method is characterized in that the zoom adjustment of the zoom projection lens is effected by the displacement of a lens group closest to the projection screen in the optical axis direction, and the back focus adjustment is effected by the displacement of the associated image panels in the optical axis directions thereof by means of the image panel adjusting means without the need for providing an additional adjusting device on the projection lens side.

In conventional zoom lens focus adjustment, the back focus adjustment is effected by the displacement of the whole zoom lens in the optical axis direction after the zoom adjustment by each lens group is completed, as mentioned above. However, the back focus adjustment requires a complex adjusting mechanism and is not practical in an image combining and projecting apparatus to which the present invention is applied. Furthermore, it is impossible to obtain a correct focal position for each image panel in the conventional focus adjustment method. Conversely, in the focus adjusting method of the present invention, the back focus adjustment can be correctly effected for each image plane by the respective image panel adjusting means. So that a correctly focused composite image can be obtained.

According to another aspect of the present invention, there is provided an image combining and projecting apparatus comprising a plurality of light transmission type image panels, a light separating and illuminating optical system which separates and makes beams of light incident upon the image planes, and a light combining and projecting optical system which combines and projects the beams transmitted through the image planes. The light separating and illuminating optical system is provided with at least one light reflecting means in front of at least one of the image planes. The improvement is in the angle adjusting means for adjusting an angle of the light reflecting means with respect to the optical axis of the apparatus.

The angle adjusting means in the light separating and illuminating optical system adjusts the angle of the light reflecting means to be parallel with the optical axis of the light combining and projecting optical system.

In theory, it is possible to provide an angle adjusting means in the light combining and projecting optical system for adjusting the angle of the light combining and projecting optical system to make parallel the optical axes of the light combining and projecting optical system and the light separating and illuminating optical system. However, the adjustment of the optical axis of the light combining and projecting optical system invites a displacement of the images formed by the image planes, thus deteriorating image quality. Deterioration of the image quality does not occur when the adjustment of the optical axis is effected in the light separating and illuminating optical system, as in the present invention.

The light reflecting means which effects the angle adjustment with respect to the optical axis can be realized by either a light splitting element having a color filter function in which a limited wavelength can be transmitted therethrough while the other wavelengths are reflected, or a reflecting mirror which reflects all of the beams (wavelengths).

If a plurality of light reflecting mechanisms are provided in front of the respective image panels, it is desirable to make the light reflecting means which is closest to the image panel adjustable. This decreases the adjusting angle necessary to make the optical axes of the light combining and projecting optical system and the light separating and illuminating optical system parallel to each other.

BRIEF DESCRIPTION OF THE DRAWINGS

The invention will be described below in detail with reference to the accompanying drawings, in which.

DESCRIPTION OF THE PREFERRED EMBODIMENTS

Figure 1:
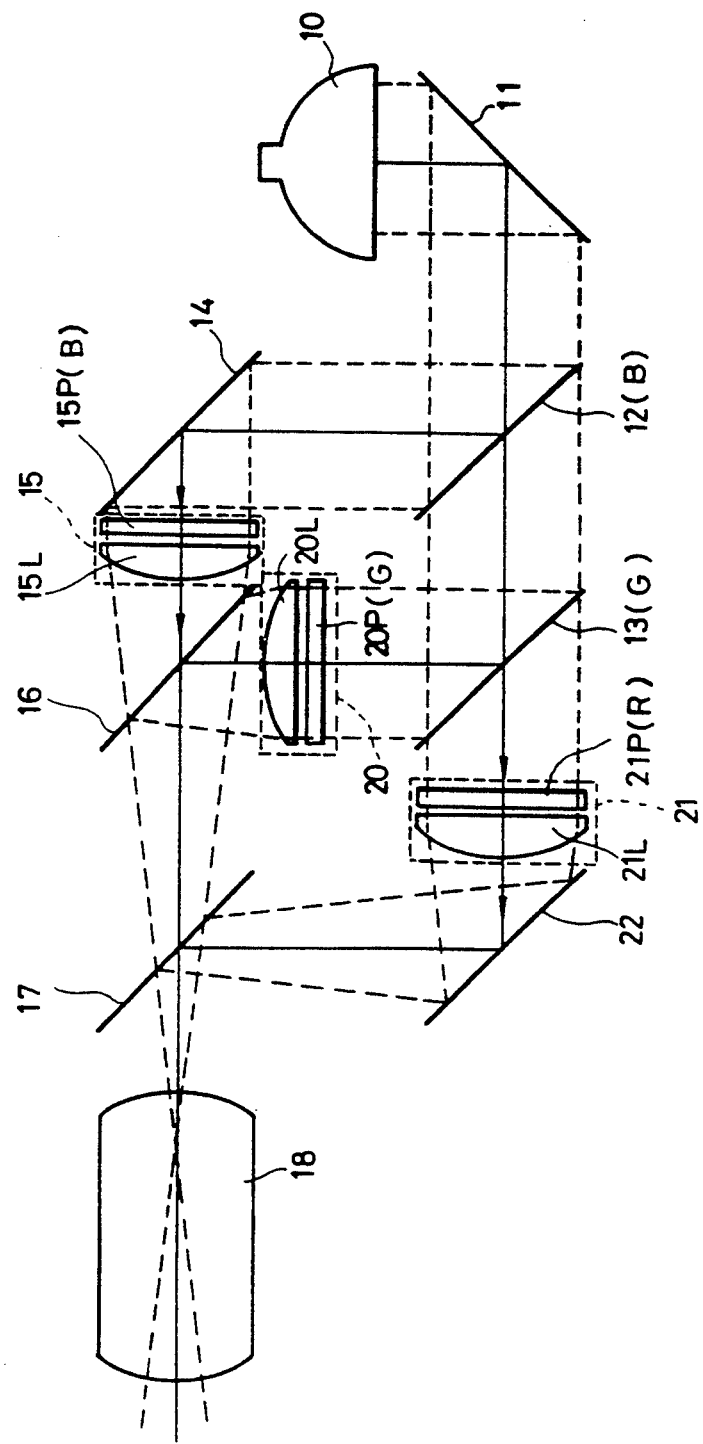
FIG. 1 is a schematic view of an optical system of an image combining and projecting apparatus according to an aspect of the present invention.

FIG. 1 shows an example of an image combining and projecting apparatus to which the subject of the present invention is applied. Parallel beams of white illuminating light emitted from a light source 10 are reflected by a cold mirror 11 and are then reflected and split or separated by a B dichroic mirror 12 and a G dichroic mirror 13, respectively.

The B dichroic mirror 12 reflects only a blue (B) component and the reflected B component is reflected by an aluminum mirror 14 and is then made incident on a B liquid crystal unit 15. The beams transmitted through the B liquid crystal unit 15 are transmitted through a G dichroic mirror 16 through which the B component is transmitted and a dichroic mirror 17 through which the B component and a green (G) component are transmitted. The beams are then incident on a projection lens 18.

The G dichroic mirror 13 reflects the G component only. The reflected beams are made incident on a green (G) liquid crystal unit 20. The beams transmitted through the G liquid crystal unit 20 are reflected by the G dichroic mirror 16 and transmitted through the dichroic mirror 17 and made incident on the projection lens 18.

The beams transmitted through the B dichroic mirror 12 and the G dichroic mirror 13 are made incident on a red (R) liquid crystal unit 21 and reflected by an aluminum mirror 22 and the dichroic mirror 17 and made incident on the projection lens 18.

The B liquid crystal unit 15 is comprised of a B liquid crystal panel 15P and a condenser lens 15L located behind, i.e., on the outgoing side of the B liquid crystal panel 15P. Similarly, the G liquid crystal unit 20 is comprised of a G liquid crystal panel 20P and a condenser lens 20L located behind the G liquid crystal panel 20P, and the R liquid crystal unit 21 is comprised of a R liquid crystal panel 21P and a condenser lens 21L located behind the R liquid crystal panel 21P. The B liquid crystal panel 15P outputs blue image data of a color image to be projected, and the G liquid crystal panel 20P and the R liquid crystal panel 21P output green and red image data, respectively. The image data is combined in the optical system as constructed above and projected onto a screen (not shown) through the projection lens 18.

The condenser lenses 15L, 20L, and 21L are located on the outgoing sides of the respective liquid crystal panels 15P, 20P, and 21P. Namely, the parallel beams emitted from the light source 10 are made incident on the liquid crystal panels 15P, 20P, and 21P. Accordingly, change (decrease) in transmittance does not occur in the liquid crystal panels 15P, 20P, and 21P. The condenser lenses 15L, 20L, and 21L converge the beams transmitted through the corresponding liquid crystal panels 15P, 20P, and 21P onto a pupil of the projection lens 18.

Figure 4:
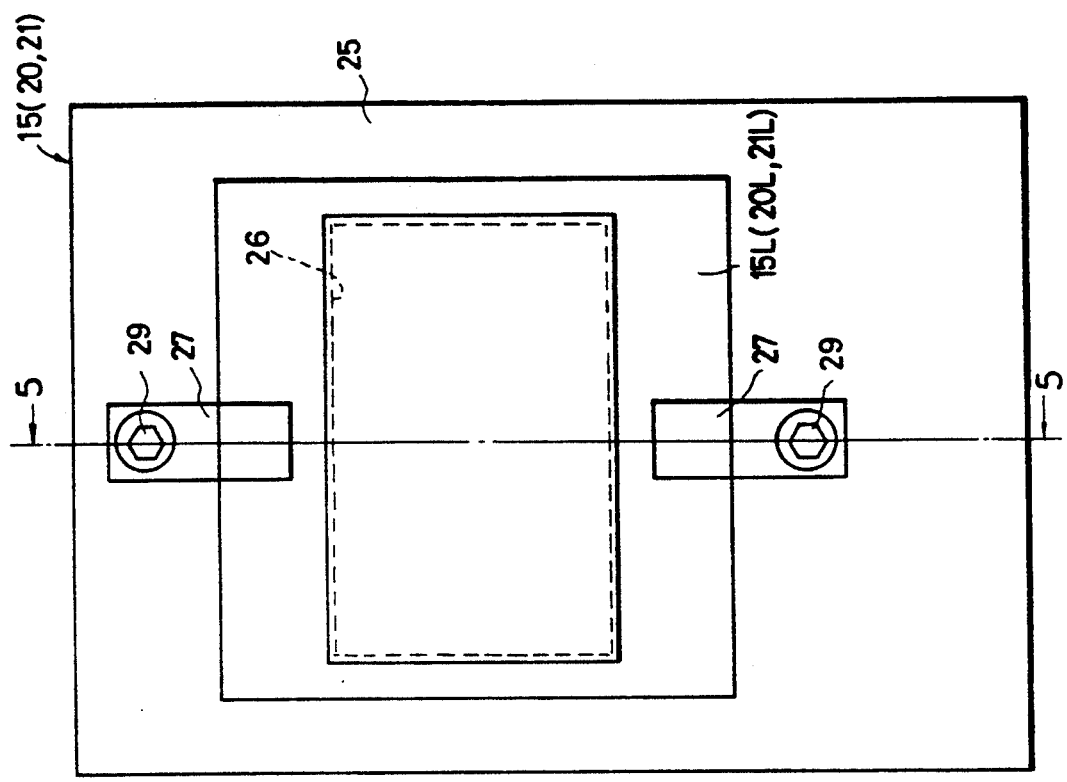
FIG. 4 is a front elevational view of an image adjusting apparatus according to an embodiment of the present invention.
Figure 5:
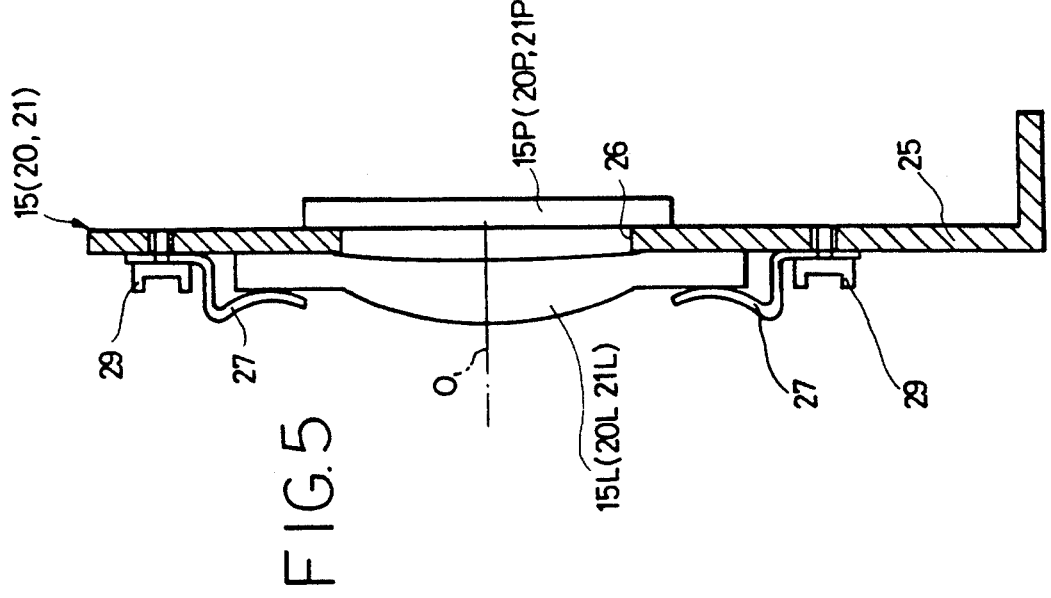
FIG. 5 is a sectional view taken along the line A—A in FIG. 4.

Each of the liquid crystal units 15, 20, and 21 includes a position adjusting device which adjusts the position of the condenser lens 15L (20L, 21L) in directions perpendicular to the optical axes thereof. As can be seen in FIGS. 4 and 5 which show a first embodiment of the position adjusting device, a substrate 25 made of a parallel plate has an opening 26 which is covered by the respective liquid crystal panel 15P (20P, 21P) which is secured to one side of the substrate 25. The condenser lens 15L (20L, 21L) is provided on the other side of the substrate 25 to cover the opening 26 through upper and lower leaf springs 27 which depress the condenser lens 15L (20L, 21L) against the substrate 25. The leaf springs 27 are secured at one end thereof to the substrate 25 by set screws 29. The condenser lens 15L (20L, 21L) is movable on and along the side face of the substrate 25 against the leaf springs 27. The movement of the condenser lens 15L (20L, 21L) against the leaf springs 27 adjusts the position of the lens 15L (20L, 21L) in the direction perpendicular to the optical axis 0 thereof.

Figure 6:
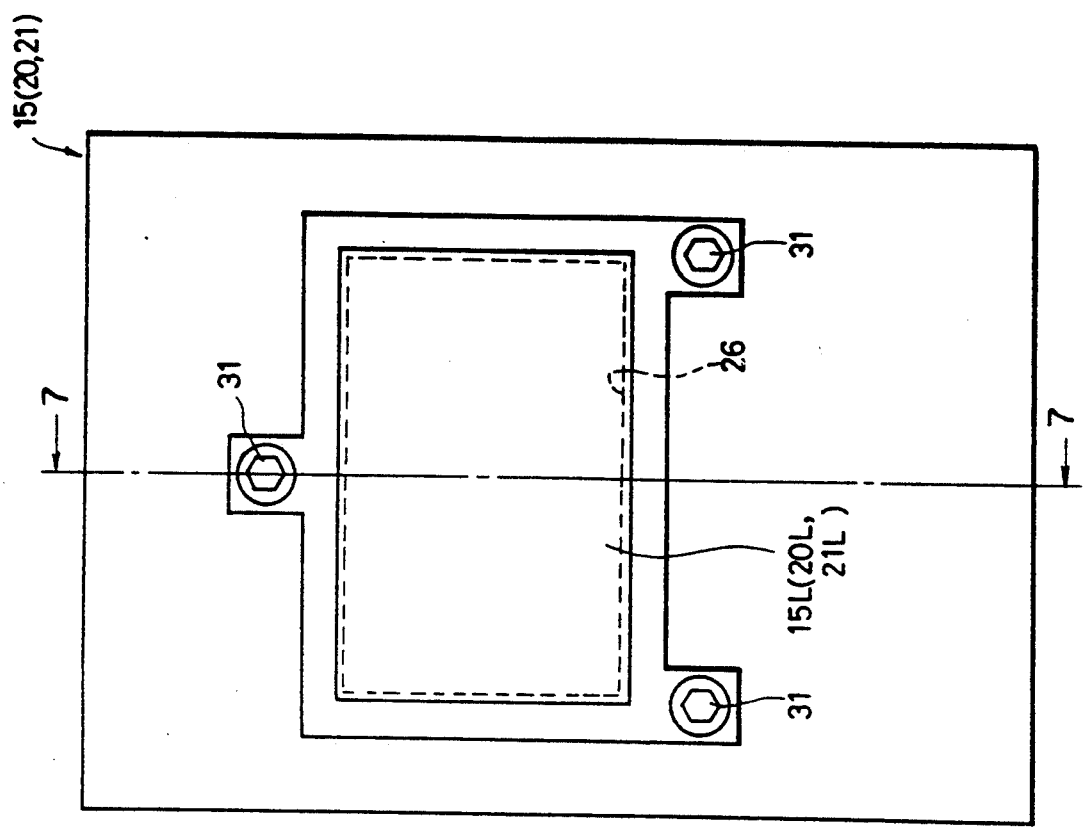
FIG. 6 is a front elevational view of an image adjusting apparatus according to another aspect of the present invention.
Figure 7:
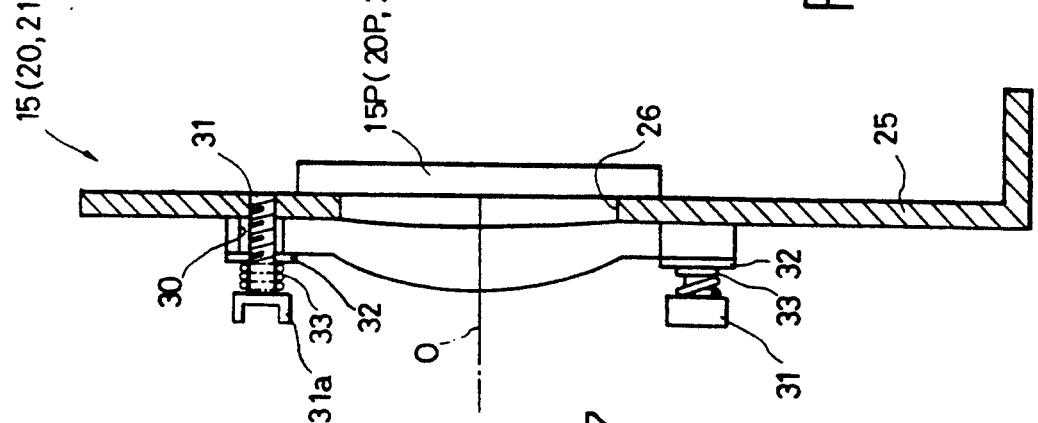
FIG. 7 is a sectional view taken along the line B—B in FIG. 6.

FIGS. 6 and 7 show another embodiment of the position adjusting device, in which a difference between the first embodiment (FIGS. 4, 5) and the second embodiment (FIGS. 6, 7) resides only in the supporting mechanism of the condenser lens 15L (20L, 21L). Namely, in the second embodiment, the condenser lens 15L (20L, 21L) is provided on the outer peripheral edge thereof with three holes 30 i which set screws 31 screwed into the substrate 25 are loosely fitted. Between the heads 31a of the set screws 31 and washers 32 provided on the set screws 31 are provided compression springs 33 which depress the condenser lens 15L (20L, 21L) against the substrate 25.

Consequently, according to the second embodiment illustrated in FIGS. 6 and 7, the condenser lens 15L (20L, 21L) is movable (adjustable) by a displacement corresponding to a slight clearance defined between the inner diameter of the holes 30 and the outer diameter of the set screws 31, in the direction perpendicular to the optical axis 0 thereof.

Figure 2:
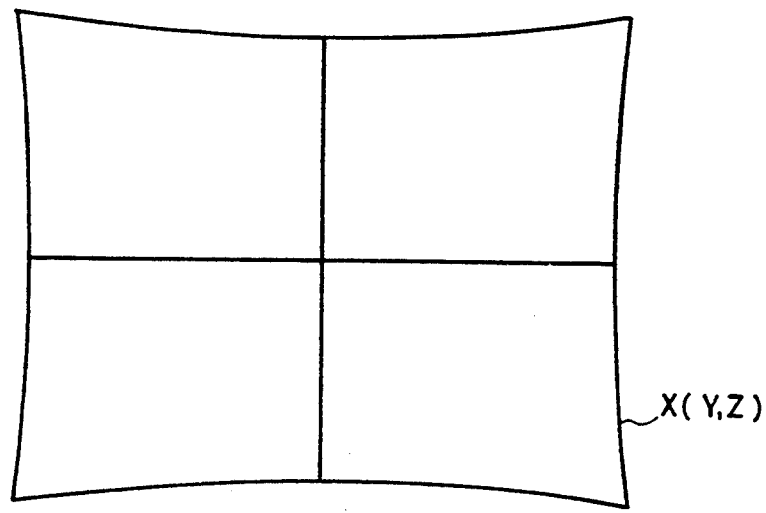
FIGS. 2 and 3 are front elevational views of different examples of distortion caused by an image combining and projecting apparatus shown in FIG. 1.
Figure 3:
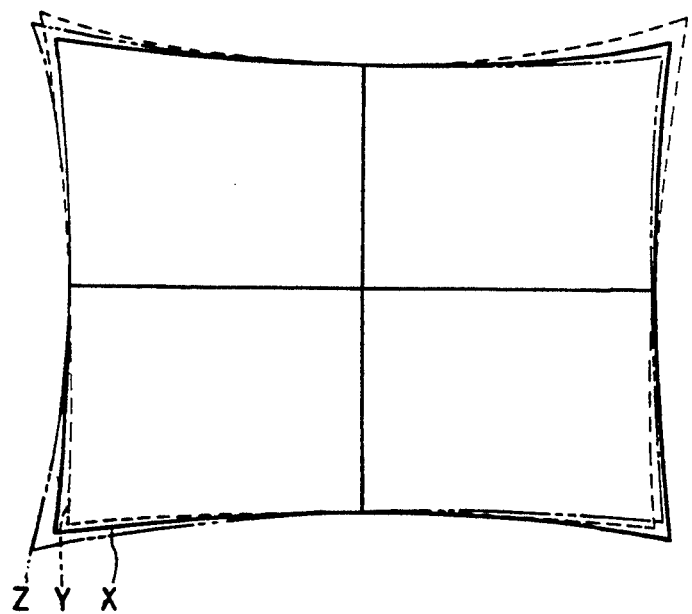

FIGS. 2 and 3 show schematic diagrams of a distortion of the condenser lenses 15L, 20L, and 21L after and before the adjustment, respectively. Note that the distortion is exaggerated in FIGS. 2 and 3. It is assumed that when the optical axis 0 of the condenser lens of one of the liquid crystal units 15, 20, and 21 is aligned on the true optical axis (e.g., the optical axis of the projection lens 18) the image containing the distortion is represented by a solid line X in FIG. 3. On the other hand, if the optical axes 0 of the condenser lenses of the two remaining liquid crystal units are deviated from the true optical axis, the images are represented, for example, by imaginary lines Y and Z due to the asymmetry of the distortion. The images Y and Z do not overlap the image X. The images Y and Z represent those images which occur when the optical axes 0 are deviated from the true optical axis in the minor side direction and major side direction, respectively. The deviation of the three colored images causes a combined colored image to be dimmed or unclear.

According to the present invention, the deviation between the three colored images Can be easily eliminated. Namely, in the above mentioned assumption, the condenser lenses corresponding to the images Y and Z are moved in the directions perpendicular to the optical axes thereof to overlap the images Y and Z on the image X. Namely, in the arrangement illustrated in FIGS. 4 and 5, the associated condenser lenses 15L, 20L, and/or 21L are moved on and along the surface of the substrate 25 in directions perpendicular to the optical axes thereof against the leaf springs 27. Similarly, in the arrangement illustrated in FIGS. 6 and 7, the associated condenser lenses 15L, 20L, and/or 21L are moved on and along the surface of the substrate 25 in directions perpendicular to the optical axes thereof, against the leaf compression springs 33. Upon adjustment, the three color images X, Y, and Z will overlap, as seen in FIG. 2. The adjustment can be carried out while observing the projected images.

Figure 8:
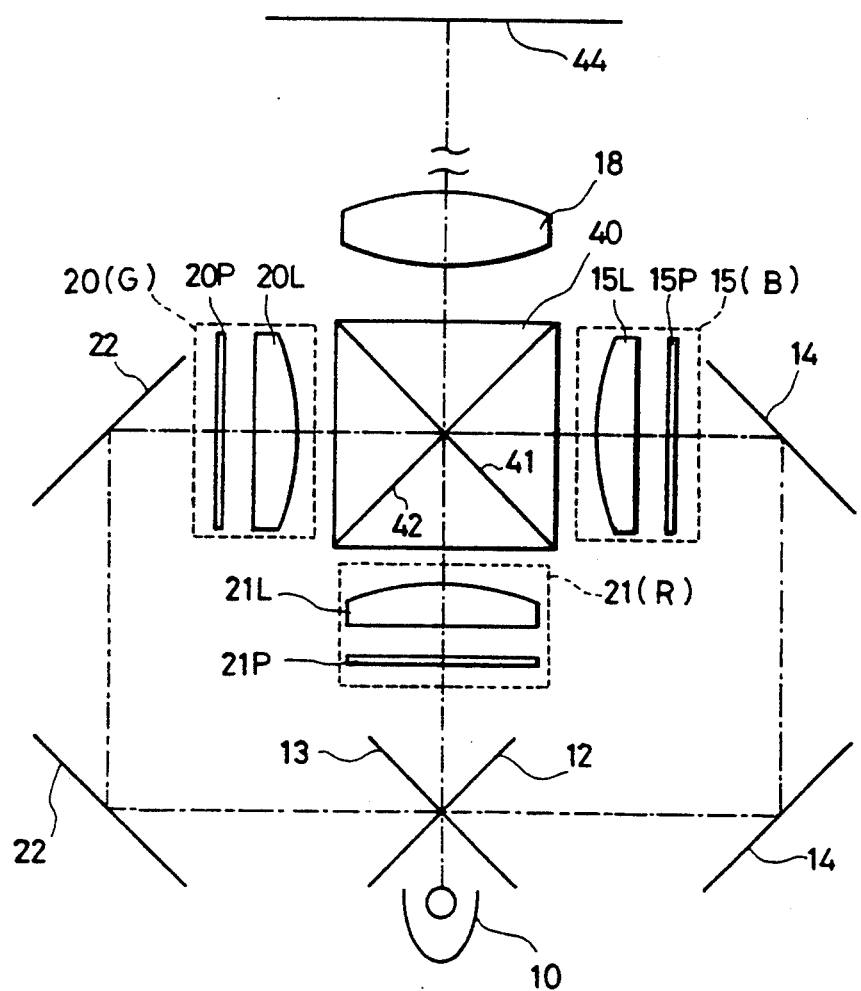
FIG. 8 is a schematic view of an optical system of an image combining and projecting apparatus according to another aspect of the present invention.

FIG. 8 shows another embodiment of an image combining and projecting apparatus according to the present invention. In this embodiment, a dichroic prism 40 is used as the image combining means. In FIG. 8, the elements corresponding to those in FIG. 1 are designated with the same reference numerals. In the illustrated embodiment, the dichroic prism 40 has orthogonal B reflecting surface 41 and G reflecting surface 42, so that the combined image can be projected onto the screen 44 through the projection lens 18.

Also in the embodiment illustrated in FIG. 8, the condenser lenses 15L, 20L, and 21L of the liquid crystal units 15, 20, and 21 are movable in the directions perpendicular to the optical axes 0 thereof by means of the adjusting mechanism shown in FIG. 4 or FIG. 7. Consequently, the same effect as that of the previously mentioned embodiment can be achieved in FIG. 8.

Figure 9:
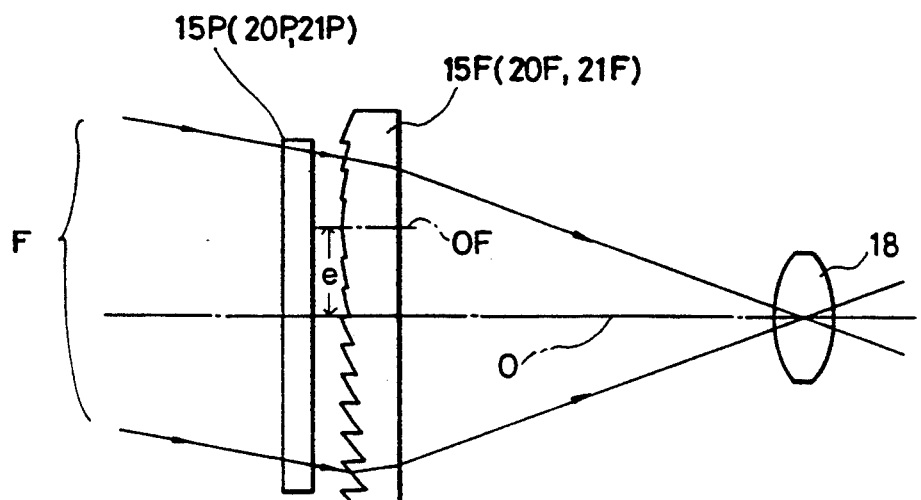
FIG. 9 is a front elevational view of an image adjusting apparatus according to another embodiment of the present invention.

FIG. 9 shows still another embodiment of the present invention. In this embodiment, an optical system using an eccentric lens is employed in an image combining and projecting apparatus of the present invention. As is well known, a liquid crystal panel usually exhibits a better optical property when parallel beams are made incident thereon in an inclined direction than when parallel beams are made incident thereon in a direction normal to the panel. In view of this, as shown in FIG. 9, a bundle of beams F is made incident on the associated liquid crystal panel 15P, 20P, or 21P in an oblique direction with respect to the panel surface.

Also in FIG. 9, an eccentric Fresnel lens 15F (20F or 21F) is used as the condenser lens and is provided behind, i.e., on the outgoing side of the associated liquid crystal panel, so that the beams transmitted through the eccentric Fresnel lens are converged onto the single projection lens 18. The optical axis of the eccentric Fresnel lens 15F (20F, 21F) has an eccentricity "e" with respect to the optical axis 0 of the projection lens 18. In FIG. 9, the image combining optical system for combining the images formed by the three liquid crystal panels 15P, 20P and 21P are omitted. The eccentric Fresnel lens can be replaced with an eccentric lens other than the Fresnel lens.

According to the embodiment shown in FIG. 9, the employment of the eccentric Fresnel lenses as the condenser lenses contributes to a minimization of the whole apparatus. It is possible to obtain the same shape of images formed by the three liquid crystal panels 15P, 20P, and 21P by appropriately determining the eccentricity of the eccentric Fresnel lenses 15F, 20F, and 21F with respect to the projection lens 18 to thereby obtain a clear combined color image.

FIGS. 10 through 13 show the principle of a tilt adjusting mechanism 50 which adjusts the tilt angle of the condenser lenses 15L, 20L, and 21L to overlap the three images containing the trapezoidal distortions caused by the condenser lenses. The condenser lenses 15L, 20L, and 21L are disposed on the outgoing side of the associated liquid crystal panels 15P, 20P, and 21P, similar to the previous embodiments. The condenser lenses 15L, 20L, and 21L are rotatable about two orthogonal axes P and Q perpendicular to the true optical axis 0 thereof (optical axis CO of the inclined condenser lens). Since the rotating mechanism per se is well known and no subject of the present invention is directly directed thereto, no detailed explanation therefor is given herein. The tilt adjusting mechanisms 50 of the respective condenser lenses 15L, 20L, and 21L can eliminate the trapezoidal distortion or adjust the direction of the distortion.

Figure 13:
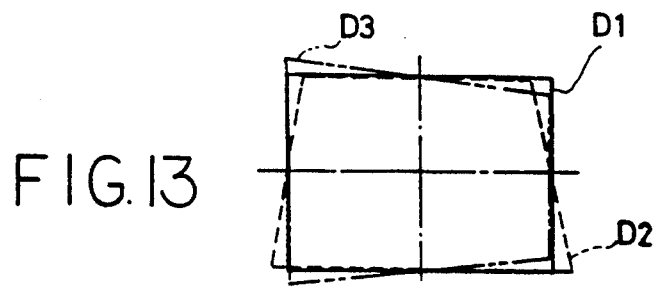
FIG. 13 is a front elevational view showing a deviation of trapezoidal distortions of images formed by a plurality of liquid crystal panels.

FIG. 13 shows a schematic diagram of trapezoidal distortions D1 (solid line), D2 (dotted line), and D3 (two-dotted and dashed line) of the three colors which are slightly deviated from one another. The solution used in prior art to eliminate the deviation between the trapezoidal distortions was to precisely readjust the positions of the components including the condenser lenses, the liquid crystal panels, and the projection lens, etc. Conversely, in the present invention, the trapezoidal distortions can be corrected or adjusted by changing the optical axes CO of the condenser lenses 15L, 20L, and 21L by the tilt adjusting mechanisms 50 to accurately overlap the three images. Thus, the correction of the trapezoidal distortions of the images can be easily effected.

Figure 10:
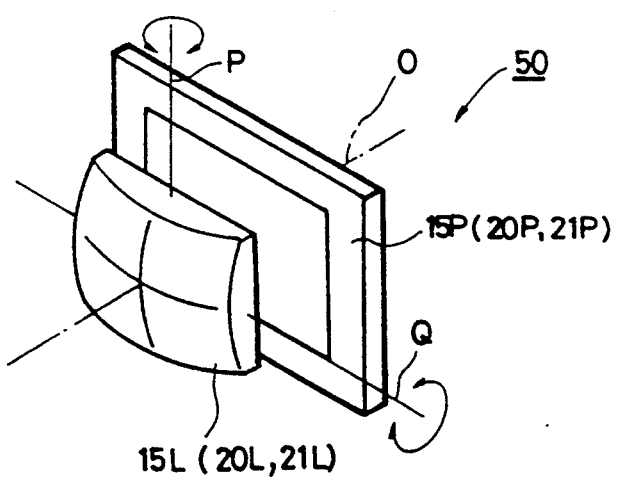
FIG. 10 is a perspective view of a main part of an image combining and projecting apparatus according to another embodiment of the present invention.
Figure 11:
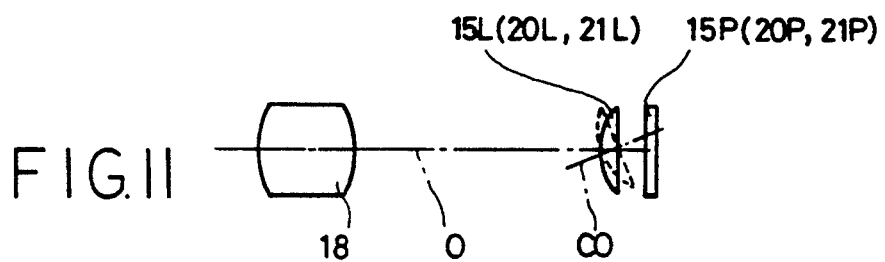
FIG. 11 is an optical schematic view showing an exaggerated tilt of a condenser lens in an apparatus shown in FIG. 10.
Figure 12:
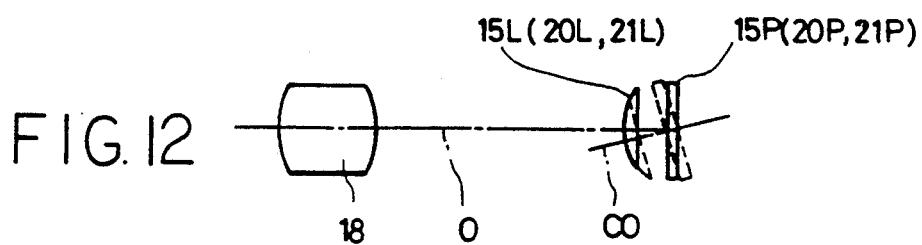
FIG. 12 is an optical schematic view showing an exaggerated tilt of a condenser lens and a liquid crystal panel.

The tilt adjusting mechanisms 50 can tilt either the associated condenser lenses 15L, 20L, and 21L only, as shown in FIGS. 10 and 11, Or both the condenser lenses 15L, 20L, and 21L, and the corresponding liquid crystal panels 15P, 20P, and 21P together, as shown in FIG. 12.

FIGS. 14 through 19 show embodiments of the present invention in which the liquid crystal panels 15P, 20P, and 21P are adjustable in the optical axis directions thereof. In these embodiments, the condenser lenses 15L, 20L, and 21L are omitted, and the elements corresponding to those in the previous embodiments are designated by the same reference numerals. In the embodiments illustrated in FIGS. 14 through 19, each of the liquid crystal panels is provided with an identical position adjusting means 130 to move the associated liquid crystal panel 15P, 20P, or 21P in the optical axis direction thereof to an optimum focal position to thereby obtain a correct combined color image in focus.

Figure 14:
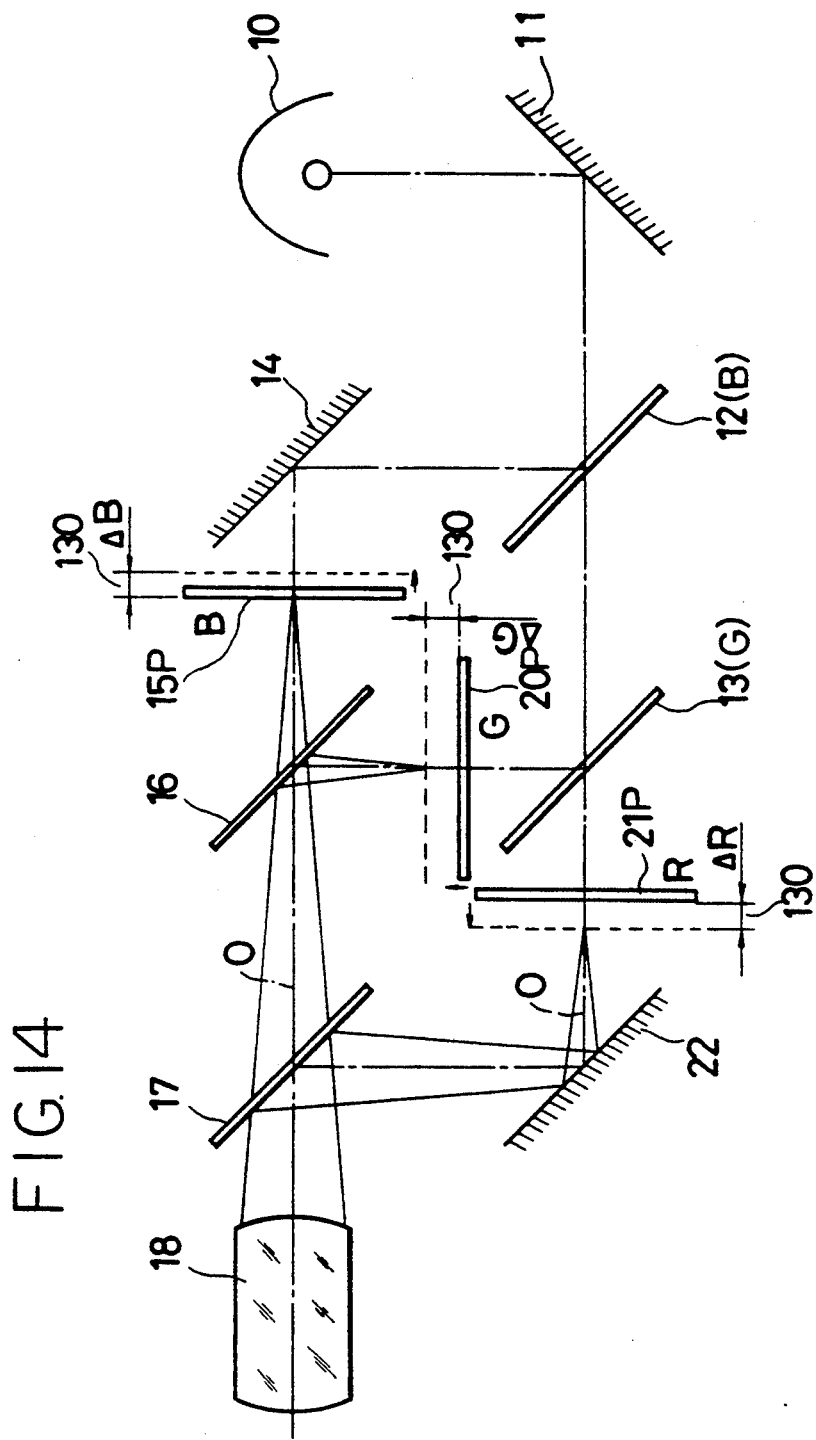
FIG. 14 is a schematic view of a focus adjusting apparatus of an image combining and projecting apparatus according to the present invention.

Namely, in the arrangement shown in, for example, FIG. 14, the panel position adjusting means 130 can move the associated liquid crystal panels (image panels) 15P, 20P, and 21P by displacements $\Delta B$, $\Delta G$, and $\Delta R$ in the optical axis directions 0 thereof, respectively. The liquid crystal panels 15P, 20P, and 21P can be moved to an optimum focal position of the projection lens 18 by the adjustment of the positions of the liquid crystal panels 15P, 20P, and 21P in the optical axis directions thereof.

Namely, the single common projection lens 18 constitutes separate optical systems for the liquid crystal panels 15P. 20P. and 21P. Consequently, the position adjusting means 130, provided for each liquid crystal panel 15P, 20P, and 21P, independently adjusts the associated liquid crystal panel to an optimum focal point of the common projection lens 18 in the optical axis directions thereof, so that a combined focused image can be projected onto the screen.

Figure 15:
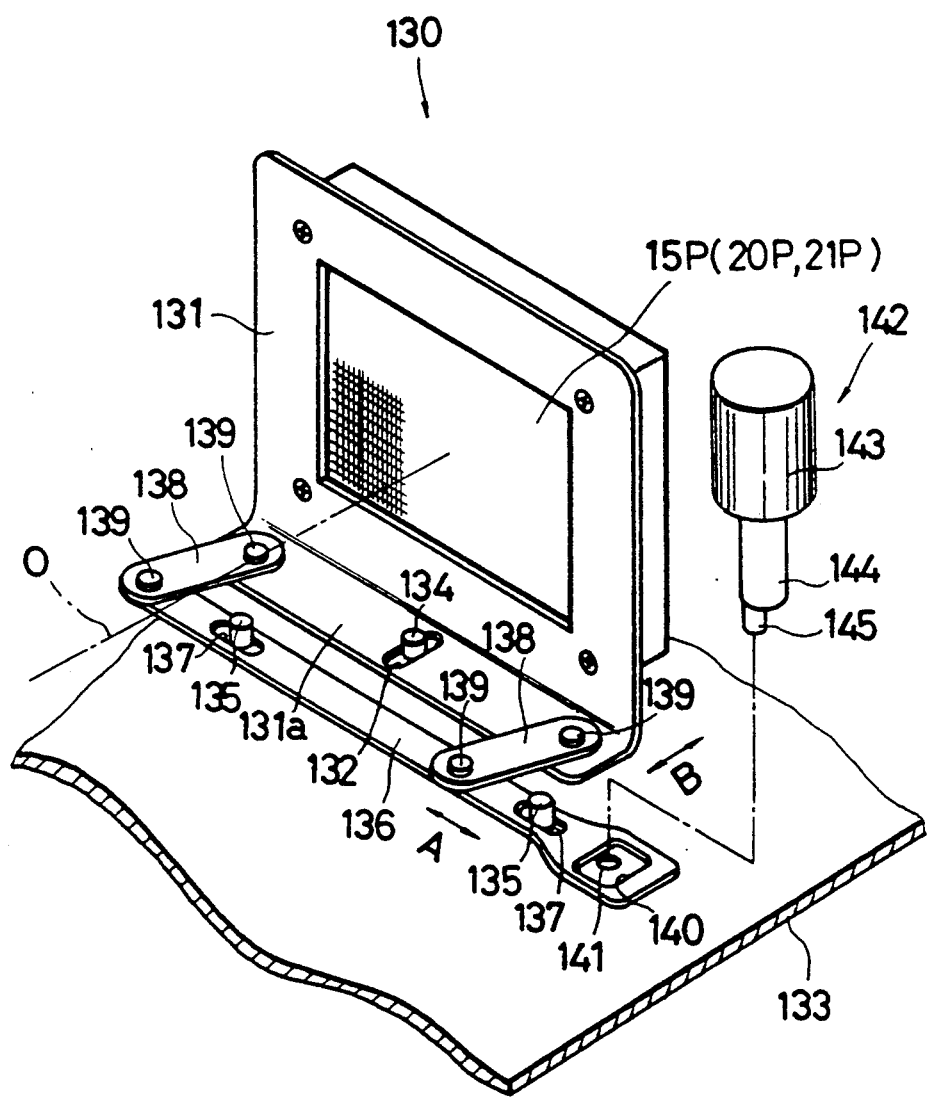
FIG. 15 is a perspective view of a concrete embodiment of a main part of a focus adjusting apparatus shown in FIG. 14.
Figure 16A:
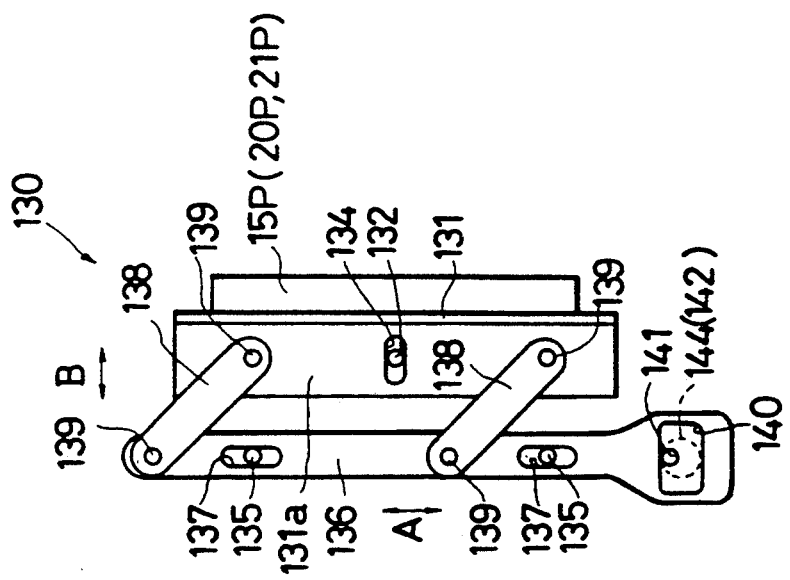
FIGS. 16A and 16B are plan views of a focus adjusting apparatus shown in FIG. 14 in different positions.
Figure 16B:
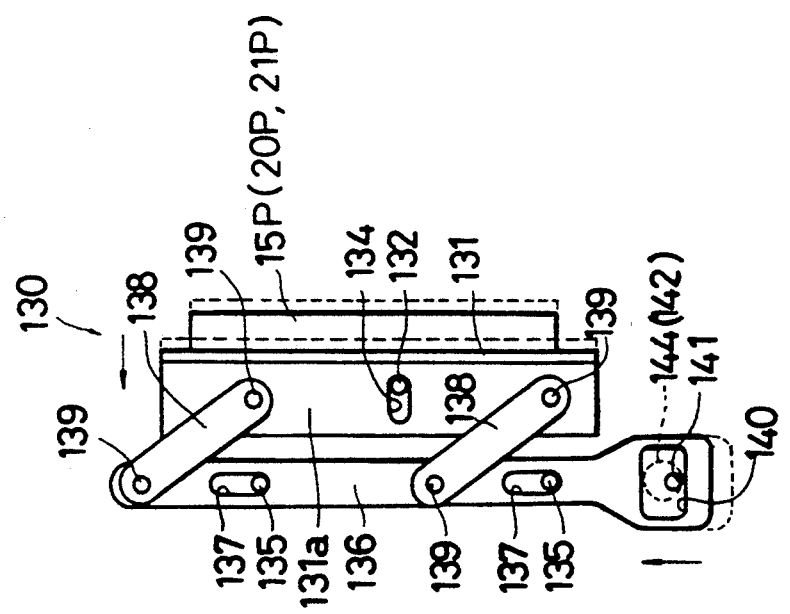

FIGS. 15, 16A, and 16B show an example of the panel position adjusting means 130 mentioned above. Although the following discussion will be directed only to the panel position adjusting means 130 of the liquid crystal panel 15P, it will be equally applied to the panel position adjusting means 130 of the other liquid crystal panels 20P and 21P.

The liquid crystal panel 15P is secured to a panel supporting frame 131 having a lower horizontal plate portion 131a which is provided thereon with a guide hole 132 extending parallel to the optical axis 0. A base plate 133 which supports the panel supporting frame 131 is provided with a guide pin 134 secured thereto, which is inserted in the guide hole 132. A pair of guide pins 135 are provided on the base plate 133 and fitted in corresponding elongated holes 137 formed in an adjusting plate 136. The adjusting plate 136 is movable within a range defined by an effective length of the elongated holes 137 in a plane parallel to the base plate 133 and in a direction perpendicular to the optical axis 0.

The adjusting plate 136 is moved orthogonally with respect to the horizontal plate portion 131a of the panel supporting frame 131 by a pair of parallel arms 138, so that when the adjusting plate 136 is moved in the direction A, in accordance with the engagement of the guide pins 135 in the elongated holes 137, the panel supporting frame 131 (liquid crystal panel 15P) is moved in the direction B (optical axis direction 0) perpendicular to the direction A. Numeral 139 designates pivot pins about which the arms 138 are pivoted. Thus, the adjusting plate 136, the horizontal plate portion 131a, and the link arms 138 constitute a parallel motion mechanism in which when the adjusting plate 136 is moved in the direction of the length thereof, the liquid crystal panel 15P is linearly moved in the optical axis direction while maintaining an orthogonal relationship with the optical axis.

The adjusting plate 136 is provided on one end thereof with a rectangular hole 140. The base plate 133 is provided with a jig inserting hole 141 corresponding to the rectangular hole 140. A jig 142 is comprised of a rotatable operation knob 143, a circular post 144 which is inserted in the rectangular hole 140, and an eccentric rod 145 which is eccentric to the circular post 144 and fitted in the jig inserting hole 141. Consequently, in the state in which the circular post 144 and the eccentric rod 145 of the jig 142 are inserted in the angular hole 140 and the jig inserting hole 141, respectively, when the operation knob 143 is rotated, the adjusting plate 136 is moved in the direction A. Accordingly, the panel supporting frame 131 and consequently the liquid crystal panel 15P are moved in the optical axis direction 0, as shown in FIGS. 16A and 16B.

The image panel position adjusting means 130, as constructed above, can be actuated to appropriately adjust the position of the liquid crystal panel 15P in the optical axis direction 0. After adjustment, the panel supporting frame 131 can be immovably fixed to the base plate 133 by a securing means, such as an adhesive or set screws, etc.

Figure 17:
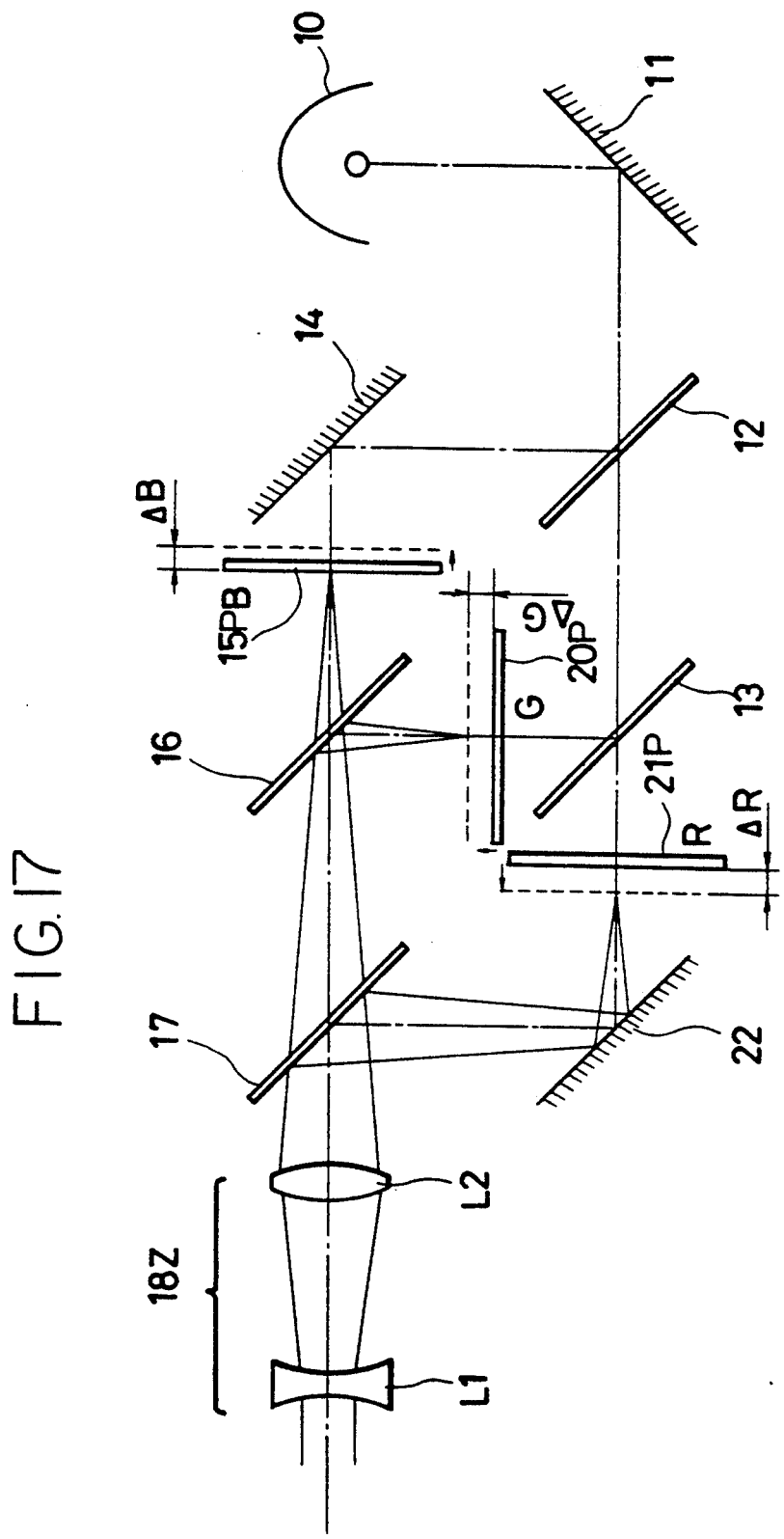
FIG. 17 is a schematic view of a focus adjusting apparatus of an image combining and projecting apparatus according to the present invention.
Figure 18:
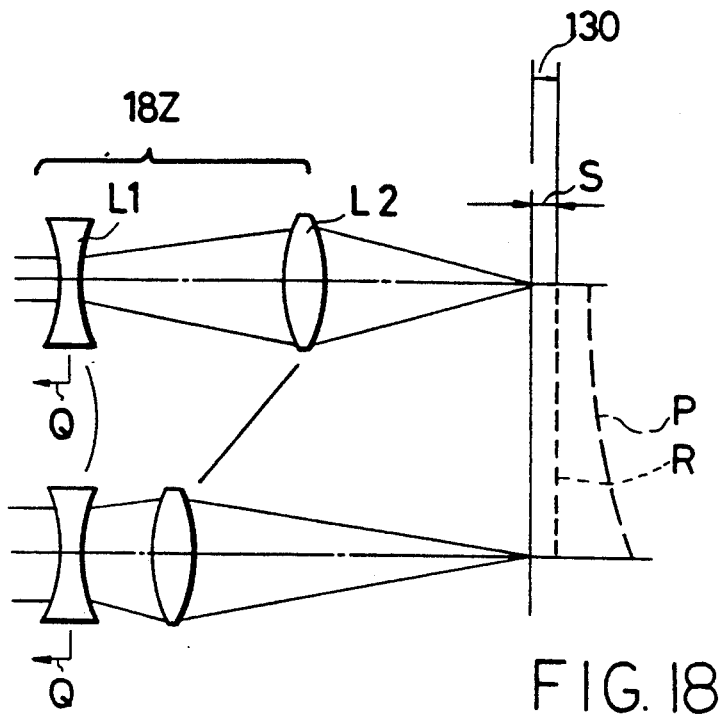
FIG. 18 is a schematic view of an optical system showing how to adjust the focus of a zoom lens shown in FIG. 17.

FIGS. 17 and 18 show a modified embodiment of the present invention. In this embodiment, the projection lens 18 is in the form of a zoom lens 18Z having two lens groups. In FIG. 17, the elements corresponding to those in FIG. 14 are denoted by the corresponding reference numerals. The zoom lens 18Z includes a first lens group L1 and a second lens group L2. As is well known, the zooming is effected by moving the zoom lens 18Z in the optical axis direction after the adjustment is completed. During the zooming operation, the spatial distance between the first and second lens groups L1 and L2 is varied while maintaining a predetermined relationship therebetween. On the other hand, the focusing operation is effected by moving the first lens group L1 only in the optical axis direction. The zoom adjustment and the back focus adjustment must be accurately effected to realize precise zooming and focusing operations.

The zoom adjustment in which no movement of the focal position takes place during zooming is usually effected by the axial movement of the first lens group L1. The same is true in the present invention. Namely, the zoom adjustment is effected by the axial adjustment of the first lens group L1, in the present invention.

The back focus adjustment is effected to move the liquid crystal panels 15P, 20P, and 21P to the focal positions of the zoom projection lens 18Z after the zoom adjustment is finished. In the present invention, the back focus adjustment is effected by the image panel position adjusting means 130. As mentioned above, the liquid crystal panels 15P, 20P, and 21P constitute separate or independent optical systems in which the zoom projection lens 18Z is commonly employed. Consequently, when the back focus adjustment is independently effected by the respective image panel position adjusting means 130 for each of the liquid crystal panels 15P, 20P, and 21P, an optimum focal position of the zoom lens 18Z is obtained for each liquid crystal panel, so that a combined focused color image can be projected onto the screen.

FIG. 18 shows the principle of the zoom adjustment and the back focus adjustment in the present invention. In FIG. 18, the upper half shows a short focal point state and the lower half a long focal point state, respectively. The focal point moves for example as shown at a phantom line P during the zooming in the absence of the zoom adjustment. The zoom adjustment prevents the movement of the focal point by the adjustment Q of the position of the first lens group L1 in the optical axis direction. Namely, no displacement of the focal point takes place during the zooming operation when the zoom adjustment is effected, as shown at a dotted line R.

Even after the zoom adjustment is completed, the focal position R does not always meet the positions of the liquid crystal panels 15P, 20P, and 21P. Namely, there may be a deviation (amount of defocus) S between the focal position R and the positions of the liquid crystal panels 15P, 20P, and 21P. The deviation S (FIG. 18) depends on the liquid crystal panels 15P, 20P, and 21P. In the present invention, the deviation S can be eliminated by the image panel position adjusting means 130.

Figure 19:
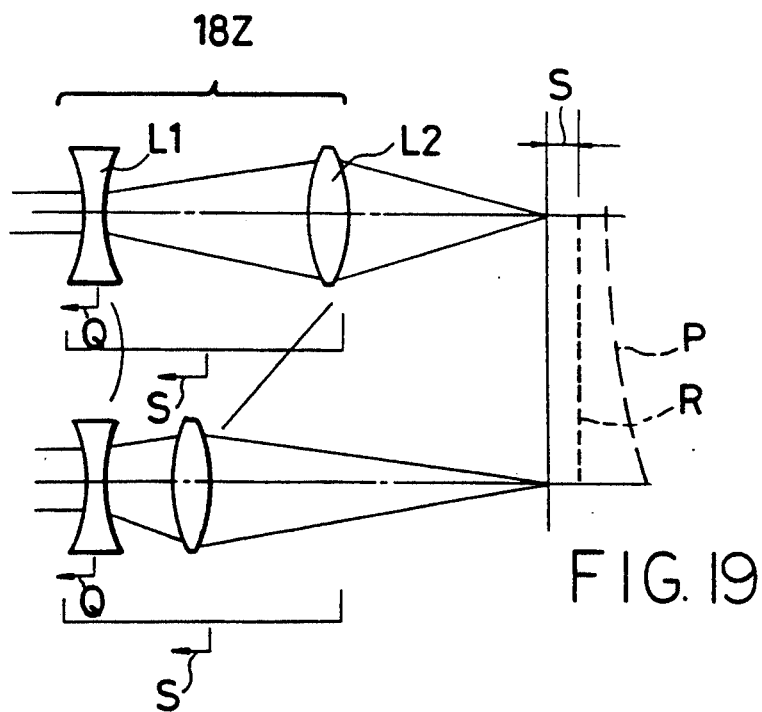
FIG. 19 is a schematic view of an optical system showing the manner in which the focus of a zoom lens is adjusted in a prior art.

FIG. 19 corresponds to FIG. 18 and shows conventional zoom adjustment and back focus adjustment. In FIG. 19, the zoom adjustment is effected in the same way as that in FIG. 18, however the back focus adjustment is effected by the movement of both the first and second lens groups L1 and L2 in the optical axis direction through a distance S equal to the deviation S between the focal position R and the associated liquid crystal panel. However, in the conventional back focal adjustment shown in FIG. 19, since both the first and second lens groups L1 and L2 are moved, the control and construction thereof is complicated. Furthermore, since the deviation (defocus amount) S depends on the liquid crystal panels 15P, 20P, and 21P, it was formerly impossible to independently obtain an optimum focal point for each liquid crystal panel. Conversely, in the present invention, as shown in FIG. 18, an optimum focal point can be easily obtained for each liquid crystal panel 15P, 20P, and 21P.

Figure 20:
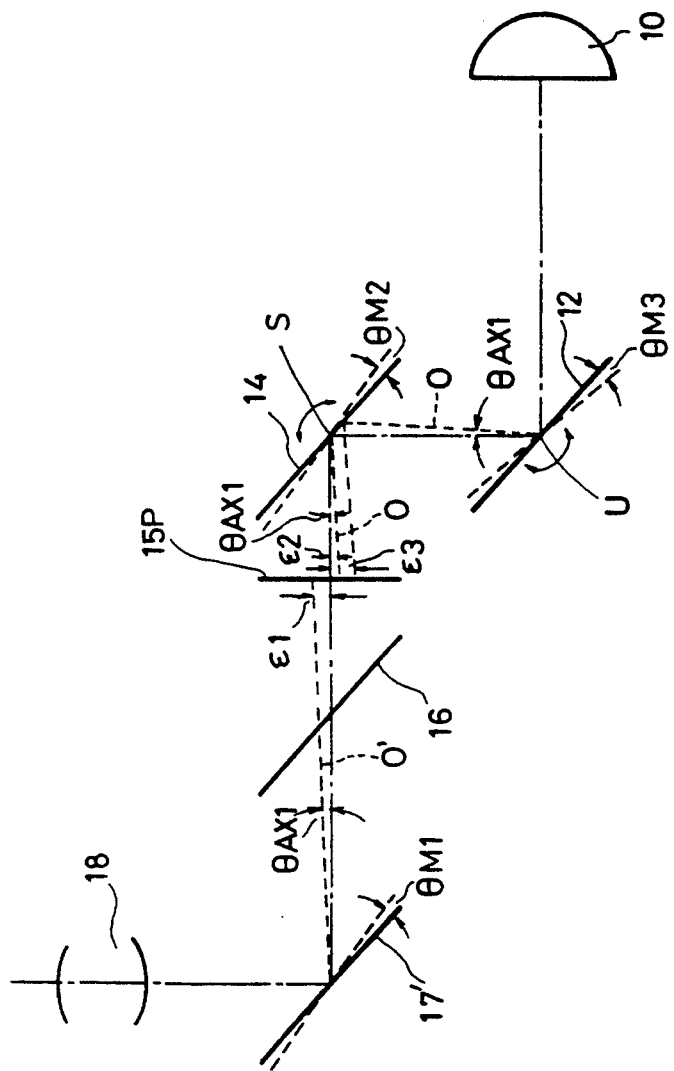
FIG. 20 is a schematic view of an optical system showing the principle of adjustment of the optical axis in an image combining and projecting apparatus according to the present invention.
Figure 21:
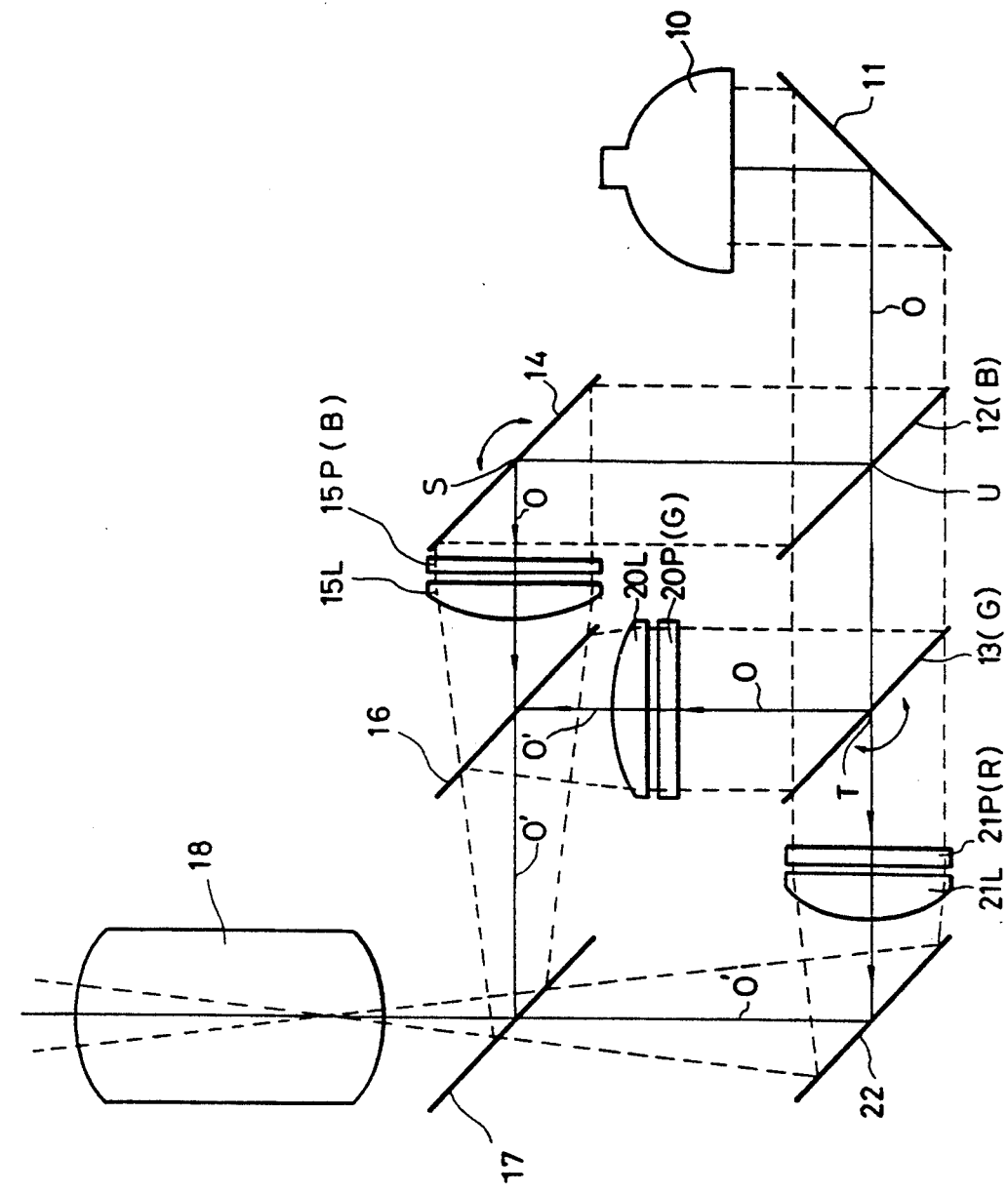
FIG. 21 is a schematic view of an entire optical system of an image combining and projecting apparatus according to the present invention; and, FIG. 22 is a perspective view of an entire optical system shown in FIG. 21.
Figure 22:
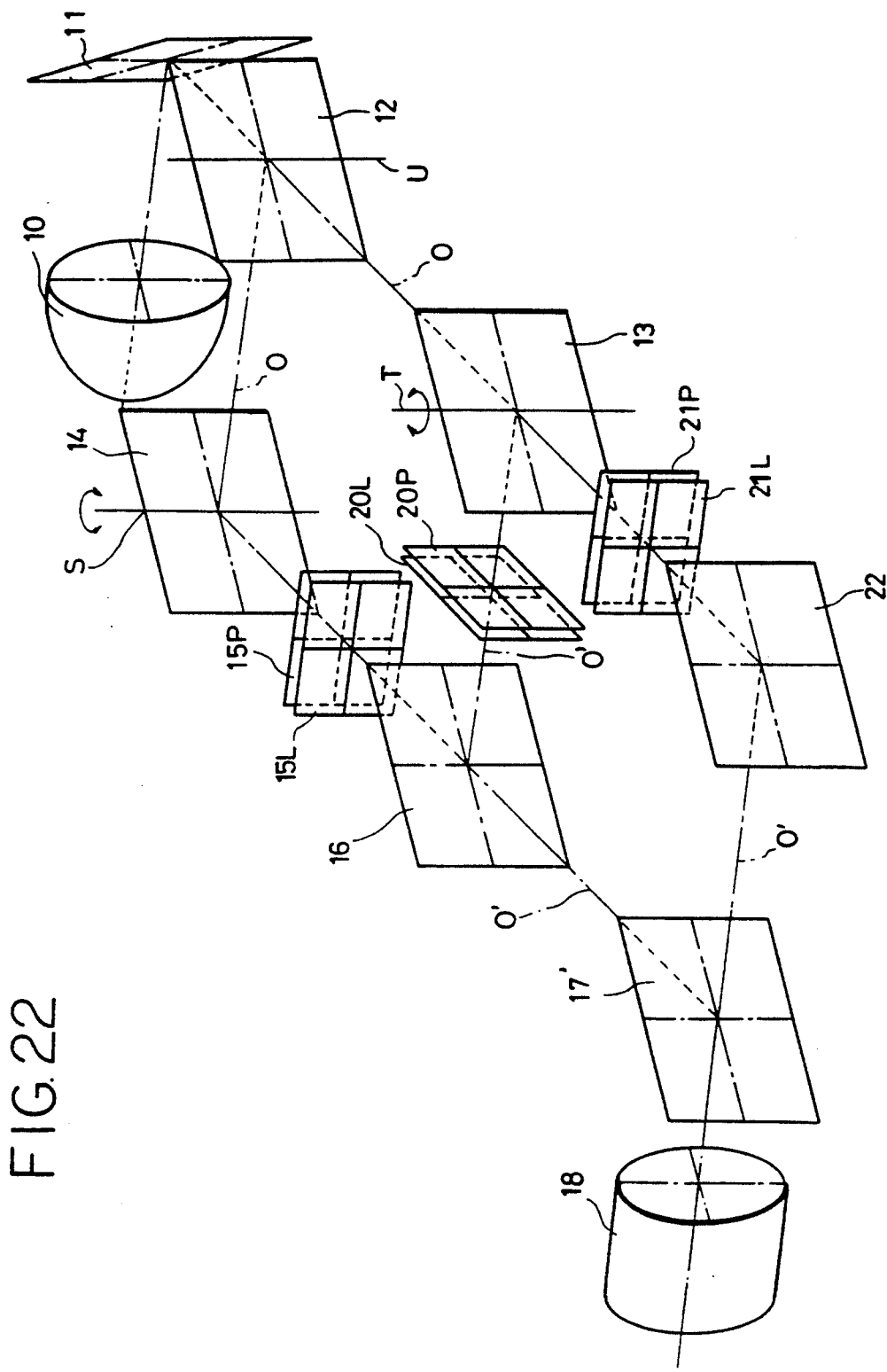

FIGS. 20 through 22 show another embodiment in which an image combining and projecting apparatus is comprised of a plurality of light transmission type image panels, a light separating and illuminating optical system which separates beams and illuminates the image panels with the separated beams, and a light combining and projecting optical system which combines and projects the beams transmitted through the image panels onto a screen. The light separating and illuminating optical system in this embodiment is provided with at least one light reflecting means in front of at least one image panel, wherein the improvement comprises an angle adjusting means for adjusting the angle of the light reflecting means with respect to the optical axis thereof.

The embodiment illustrated in FIGS. 21 and 22 corresponds to the embodiment shown in FIGS. 1 and 14, but differs in that the dichroic mirror 17' reflects blue light transmitted through the B liquid crystal unit 15P and green light transmitted through the B liquid crystal panel 15G. Red light transmitted through the R liquid crystal panel 21P is transmitted through the dichroic mirror 17'. The remaining construction of the embodiment shown in FIGS. 21 and 22 is optically identical to that of FIGS. 1 and 14.

In the optical arrangement as constructed above, according to the feature of this embodiment, the angle of the aluminium mirror 14 provided on the side of the B liquid crystal unit 15P adjacent to the light source to function as the means for reflecting blue light and the angle of the G dichroic mirror 13 provided on the side of the G liquid crystal panel 20P adjacent to the light source to function as the means for reflecting green light are adjustable with respect to the optical axis 0. Namely, the aluminium mirror 14 and the G dichroic mirror 13 are rotatable about points S and T intersecting the optical axis 0 of the light separating and illuminating optical system, respectively.

It should be appreciated that there is no means for reflecting red light on the side of the R liquid crystal panel 21P adjacent to the light source. Neither the G dichroic mirror 13 nor the B dichroic mirror 12 serve as a means for reflecting red light. The cold mirror 11 reflects visible light including red light.

The B dichroic mirror 12 is located before the B liquid crystal unit 15P to reflect blue light. Accordingly, although it is theoretically possible to rotate the B dichroic mirror 12 about an axis U to make the optical axis 0 thereof parallel with the optical axis 0' of the combining and projecting optical system, it is more practical to rotate the aluminium mirror 14 closer to the B liquid crystal unit 15P than the B dichroic mirror 12. The reason why it is preferable to make the reflecting means closer to the B liquid crystal unit 15P adjustable as opposed to making the reflecting means farther from the B liquid crystal unit 15P adjustable will be discussed below with reference to FIG. 20. The principle of the optical adjustment according to the present invention will also be discussed below with reference to FIG. 20.

The inclined angle $\theta$ AX1 of the optical axis caused by an angular error $\theta$ M1 of the dichroic mirror 17' is identical to $2\theta$ M1. The deviation $\epsilon 1$ of the optical axis on the B liquid crystal unit 15P is identical to L1$\times 2\theta$ M1, wherein L1 is the distance between the dichroic mirror 17' and the B liquid crystal unit 15P. If the aluminium mirror 14 or the B dichroic mirror 12 is rotated about the axis S or U to adjust the angle thereof, it is possible to align the optical axis 0 of the separating and illuminating optical system to be parallel to the optical axis 0' of the combining and projecting optical system. Deviation of the images to be combined is thereby eliminated by the rotation of the aluminium mirror 14 or the B dichroic mirror 12 about the axis S or U, respectively, resulting in a high image quality.

The adjustment effected by the aluminium mirror 14 and by the B dichroic mirror 12 to make the optical axes 0 and 0' parallel will be analyzed in comparison below.

On the assumption that the adjusting angles of the aluminium mirror 14 and the B dichroic mirror 12 are $\theta$ M2 and $\theta$ M3, respectively, $\theta$ M2$=\theta$ M1, and $\theta$ M3$=\theta$ M1, and the inclination angles of the optical axis 0 caused thereby are both equal to $\theta$ AX1($=2\theta$ M1). The deviations $\epsilon 2$ and $\epsilon 3$ of the optical axis on the B liquid crystal unit 15P are given by $\epsilon 2 = L2 \times 2\theta$ M1 and $\epsilon 3 = L3 \times 2\theta$ M1, respectively, wherein L2 designates the distance between the aluminium mirror 14 and the B liquid crystal unit 15P, and L3 the distance between the B dichroic mirror 12 and the B liquid crystal unit 15P, respectively. Consequently, the deviation $\epsilon$ between the optical axes 0 and 0' on the B liquid crystal unit 15P is given by $\epsilon = \epsilon 1 - \epsilon 2 = (L1+L2) \times 2\theta$ M1 in case of the adjustment by the aluminium mirror 14 about the axis S and $\epsilon = \epsilon 1 - \epsilon 3 = (L1+L3) \times 2\theta$ M1 in case of the adjustment by the B dichroic mirror 12 about the axis U, respectively. It is apparent that L3 is larger than L2 (L2<L3). Accordingly, the deviation between the optical axes 0 and 0' on the B liquid crystal unit 15P by the adjustment of the aluminium mirror is smaller than that by the B dichroic mirror. Namely, the adjustment by the B dichroic mirror 12 is more advantageous than the adjustment by the aluminium mirror 14.

Since $\epsilon$ is a small value, no readjustment is necessary after the optical axes 0 and 0' are made parallel to each other by the rotational adjustment of the aluminium mirror 14 or the B dichroic mirror 12. Nevertheless, the value $\epsilon$ should ideally be made as small as possible by the adjustment of the aluminium mirror 14 or the B dichroic mirror 12 in the directions perpendicular to the optical axis 0.

The above discussion has been directed to the aluminium mirror 14 of the B liquid crystal unit 15P, it can be similarly applied to the G dichroic mirror 13 of the G liquid crystal panel 20P.

Since the rotating or adjusting mechanism of the mirror is per se known and the subject of the present invention is not directly addressed thereto, no explanation therefor is given with reference to the drawings.

We claim:

1. An image combining and projecting apparatus comprising a plurality of light transmission type image panels through which light beams are transmitted, condenser lenses corresponding to the light transmission type image panels, a beam combining means which combines beams transmitted through said image panels, and a projection lens through which beams are projected after being combined by said beam combining means, wherein the condenser lenses are provided on the light outgoing side of the corresponding image panels, said apparatus further comprising a slidable condenser lens adjusting means for adjusting the positions of the condenser lenses in a direction perpendicular to the axes thereof.

2. An image combining and projecting apparatus according to claim 1, wherein each of said slidable adjusting means comprises a stationary substrate on which the associated condenser lens is slidably supported, and a spring means for depressing the condenser lens against the stationary substrate.

3. An image combining and projecting apparatus comprising a plurality of light transmission type image panels through which light beams are transmitted, condenser lenses corresponding to the light transmission type image panels, a beam combining means which combines beams transmitted through said image panels, and a projection lens through which beams are projected after being combined by said beam combining means, wherein the condenser lenses are provided on the light outgoing in side of the corresponding image panels, said apparatus further comprising a condenser lens adjusting means for adjusting the positions of the condenser lenses, wherein each condenser lens adjusting means comprises a tilt adjusting mechanism which adjusts the inclination angle of the associated condenser lens with respect to an optical axis of the projection lens.

4. An image combining and projecting apparatus according to claim 3, wherein said each tilt adjusting mechanism rotates the associated condenser lens and corresponding image panel together.

5. An image combining and projecting apparatus comprising a plurality of light transmission type image panels through which light beams are transmitted, condenser lenses corresponding to the light transmission type image panels, a beam combining means which combines beams transmitted through said image panels, and a projection lens through which beams are projected after being combined by said beam combining means, wherein the condenser lenses are provided on the light outgoing side of the corresponding image panels, said apparatus further comprising a condenser lens adjusting means for adjusting the positions of the condenser lenses, wherein said condenser lenses comprise eccentric lenses.

6. An image combining and projecting apparatus according to claim 5, wherein said eccentric lenses are eccentric Fresnel lenses.

7. An image combining and projecting apparatus comprising a plurality of light transmission type image panels through which light beams are transmitted, condenser lenses corresponding to the light transmission type image panels, a beam combining means which combines beams transmitted through said image panels, and a projection lens through which beams are projected after being combined by said beam combining means, wherein the condenser lenses are provided on the light outgoing side of the corresponding image panels, said apparatus further comprising a condenser lens adjusting means for adjusting the positions of the condenser lenses, wherein the optical axes of the condenser lenses are eccentric with respect to and do not meet the optical axis of the projection lens.

8. An image combining and projecting apparatus comprising:
 a plurality of light transmission type image panels;
 a light separating and illuminating optical system which separates the light beams and makes them incident on the image panels; and,
 a light combining and projecting optical system which combines and projects the beams transmitted through the image panels;
 wherein said light separating and illuminating optical system comprises at least one light reflecting means before at least one image panel in the optical path direction; and,
 wherein said apparatus further comprises an angle adjusting means for adjusting the angle of the light reflecting means with respect to the optical axis.

9. An image combining and projecting apparatus according to claim 8 comprising, a plurality of light reflecting means before said at least one image panel, and wherein the angle of the light reflecting means closest to the image panel is adjustable with respect to the optical axis.

10. An image combining and projecting apparatus according to claim 9, wherein said light reflecting means has a wavelength filtering function to reflect a specific predetermined wavelength.

11. An image combining and projecting apparatus according to claim 10, wherein said light reflecting means comprises a total reflecting mirror which reflects all wavelengths.

12. An image combining and projecting apparatus, comprising a plurality of light transmission type image panels through which light beams are transmitted, condenser lenses corresponding to the light transmission type image panels, a beam combining means which combines beams transmitted through said image panels, and a projection lens through which beams are projected after being combined by said beam combining means,
 wherein said condenser lenses are provided on the light outgoing side of the corresponding image panels; and,
 wherein said condenser lenses are made of eccentric lenses having optical axes that are eccentric with respect to the optical axis of the projection lens.

13. An image combining and projecting apparatus according to claim 12, wherein the centers of said image panels are deviated from the optical axis of the projection lens.

14. An image combining and projecting apparatus comprising a plurality of light transmission type image panels through which light beams are transmitted, condenser lenses corresponding to the light transmission type image panels, a beam combining means which combines beams transmitted through said image panels, and a projection lens through which beams are projected after being combined by said beam combining means,
 wherein said condenser lenses are located on the light outgoing side of the associated image panels; and,
 wherein said apparatus comprises tilt adjusting mechanisms which adjust the inclination angles of the condenser lenses with respect to the optical axes thereof.

* * * * *